Sept. 3, 1929.        O. CORADI        1,726,651
THREAD COUNTING MICROSCOPE
Filed Aug. 22, 1925
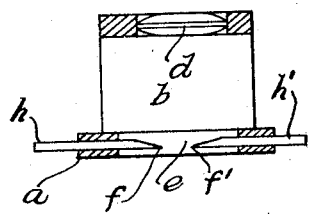
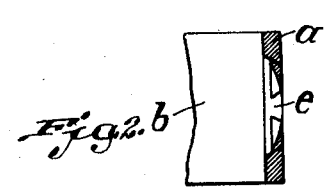
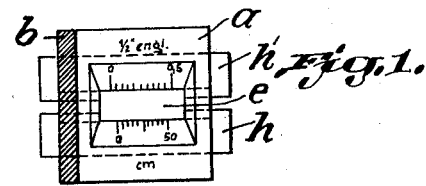
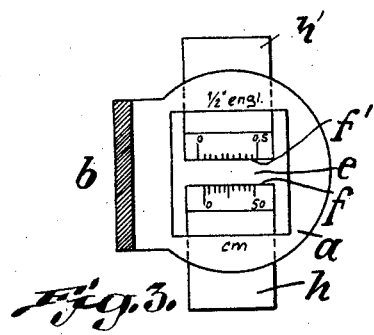
Inventor
Oswald Coradi
By B. Singer, Atty.

Patented Sept. 3, 1929.

1,726,651

UNITED STATES PATENT OFFICE.

OSWALD CORADI, OF ZURICH, SWITZERLAND.

THREAD-COUNTING MICROSCOPE.

Application filed August 22, 1925, Serial No. 51,848, and in Switzerland September 16, 1924.

The present invention relates to an improved lens or microscope particularly for counting the threads of fabrics.

The main object of the invention is to provide an improved device of the said class which is particularly suitable for counting the threads of fabrics, said device giving free access to the fabric during the counting, facilitating the shifting of the fabric and therewith the accurate counting of the threads.

Measuring microscopes, hitherto known, as used for counting the threads of fabrics, fall into two groups. One thereof uses as a comparative measure openings of accurately determined size, for example, square openings of 1 cm. or ½″ side length. The other group uses the known object micrometer as comparative measure.

Practice has shown that both systems have very important disadvantages connected therewith, which in some render the measurement, if not quite impossible, very difficult. The apparatus of the first group however, leave the object to be measured freely accessible during the measuring, but do not enable intermediate values to be ascertained, also the measuring edges are always at the outermost edge of the field of vision, thus influencing accurate measuring.

In the apparatus of the second group with object micrometers the object to be measured is completely covered by the glass plate carrying the scale, the use of a probe, as is necessary for spreading the threads apart, is therefore excluded. The invention resides in the parts and the combination of parts hereinafter described and particularly set forth in the claims appended hereto.

In order that my invention may be clearly understood I have illustrated the same in the accompanying drawings, in which Fig. 1 is a horizontal section of my improved microscope with a view of the base plate.

Fig. 2 is a detail thereof in section.

Fig. 3 is a horizontal section with plan of the base plate according to another example of construction.

Fig. 4 is a vertical section of the same.

My improved microscope comprises a stand of metal of which $a$ is the base plate, $b$ the upright and $c$ is the holder for the objective. In the base plate $a$, underneath the objective $d$ is provided an opening $e$ which is limited by four edges, of which two oppositely disposed edges $f$, $f'$ are provided with scales, one of which shows English measure and the other metric measure.

In the form of the invention shown in Figs. 1 and 2, the base plate $a$ is provided with two dovetailed slots extending parallel one to each other, in which two correspondingly shaped bars $h$, $h'$ are slidably and exchangeably mounted. These bars are provided with the scales and they limit the opening $e$ provided in the base-plate $a$ on two sides.

In the construction according to Figs. 3 and 4 the two bars $h$, $h'$ provided each with a scale are slidably and adjustably mounted in a suitably shaped guide of the base plate $a$. The bars may be moved toward and from each other, to leave a space between them of any desired size.

The microscope according to the examples of construction described is particularly suitable for counting the threads of fabrics, it permits of accurate counting and does not prevent the use of a probe in any respect. The edges $f$, $f'$ with the scales are in close proximity to the threads to be counted and either the fabric or the scales may be moved into the most favorable position for counting either by hand or by any suitable tool.

I wish it clearly understood that I do not limit myself to the particular construction as shown and described as various changes in form and arrangement of the parts may be made without departing from the spirit of the invention.

What I wish to secure by U. S. Letters Patent is:—

1. Microscope, particularly for counting the threads of fabrics comprising a stand to receive the fabric, a lens supporting member arranged on the said stand, said stand having a base plate provided with an opening and rails movably and exchangeably mounted on the base plate of said stand at opposite sides of said opening, and having measuring graduations visible in said opening.

2. A microscope as claimed in claim 1, in which said rails are movable toward and from each other to vary the width of the opening between them.

In witness whereof I affix my signature.

OSWALD CORADI.